Aug. 6, 1935.   R. C. EVANS   2,010,538
EDUCTIVE UNIT FOR CLEANING CATCH BASINS
Filed Dec. 4, 1933   13 Sheets-Sheet 1
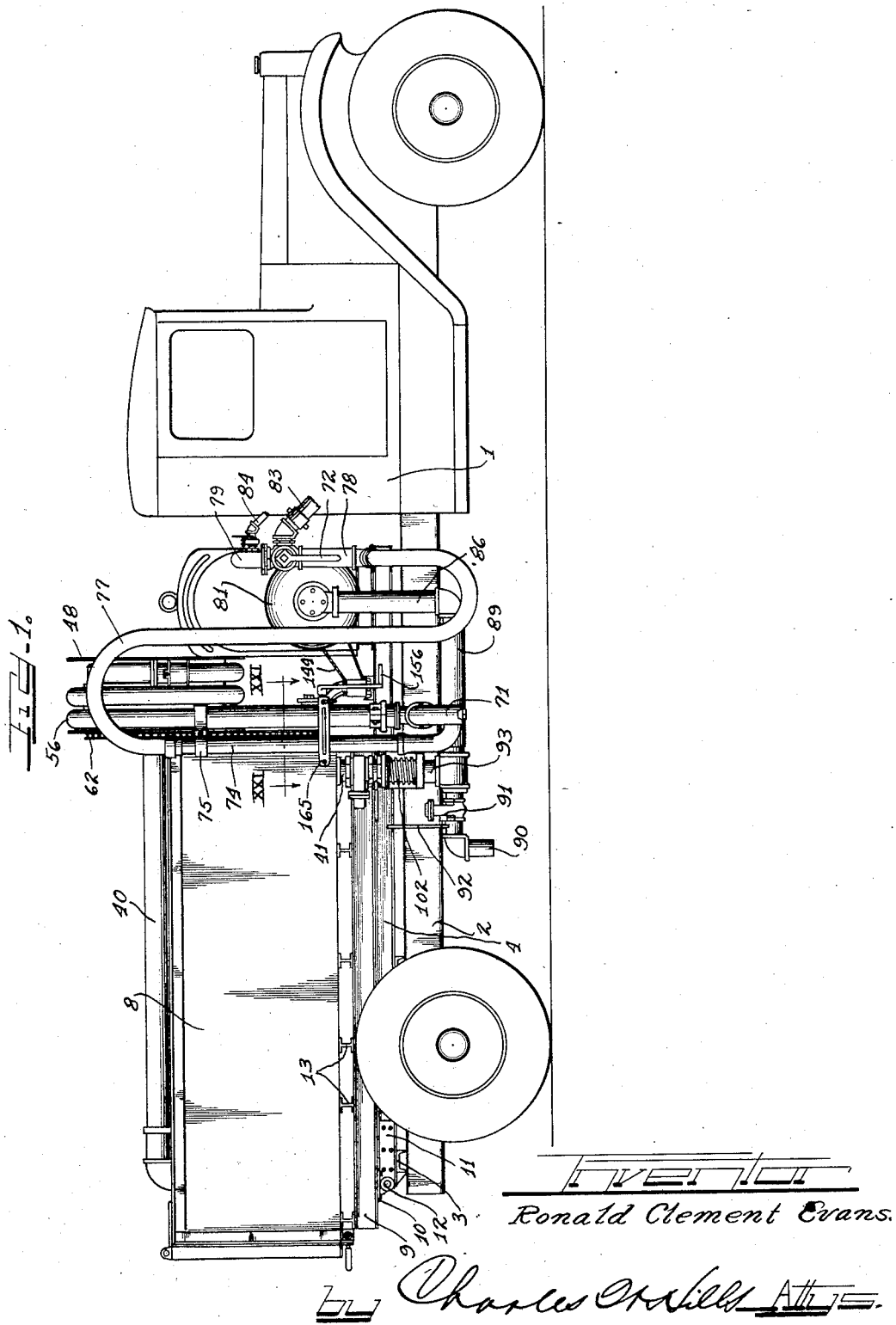
Ronald Clement Evans.

Aug. 6, 1935.   R. C. EVANS   2,010,538
EDUCTIVE UNIT FOR CLEANING CATCH BASINS
Filed Dec. 4, 1933   13 Sheets-Sheet 2
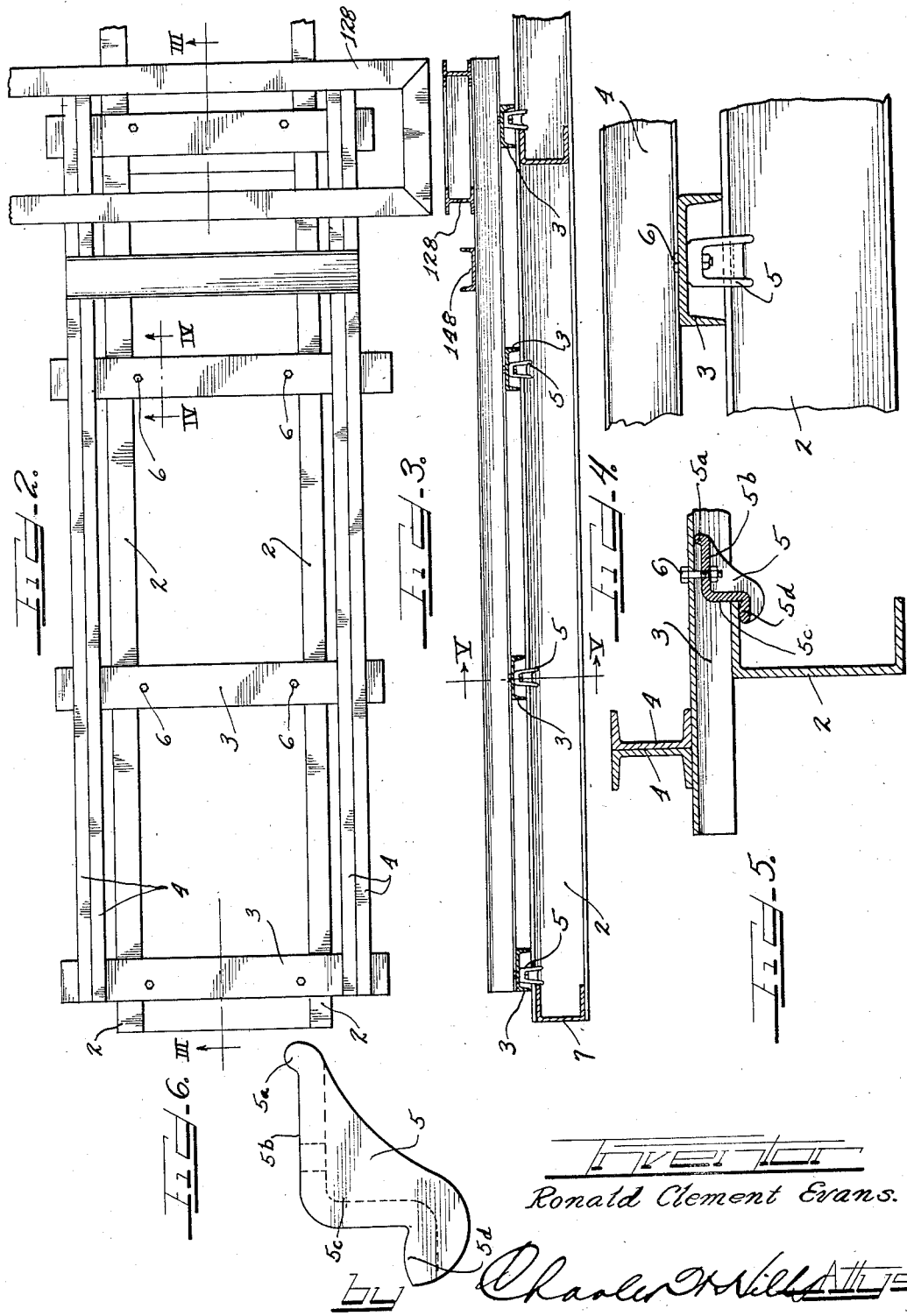

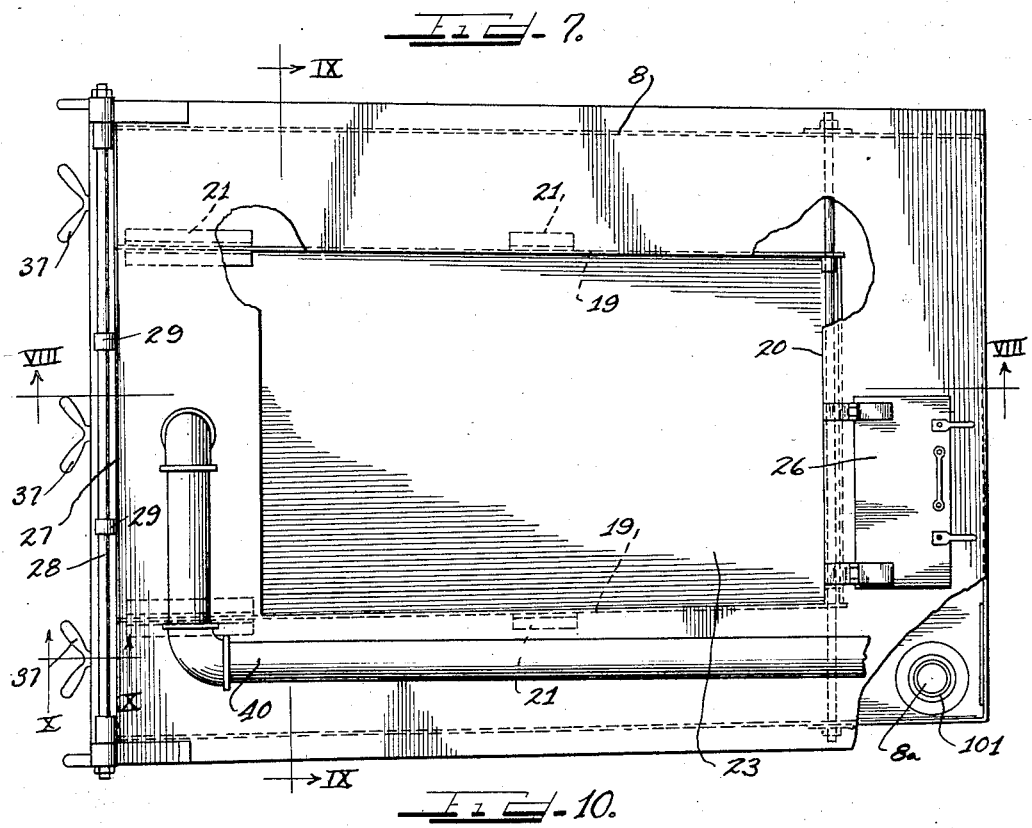
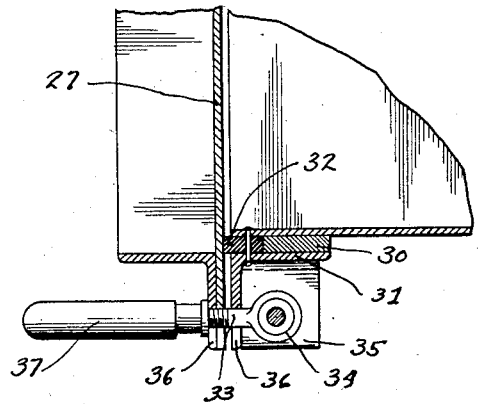

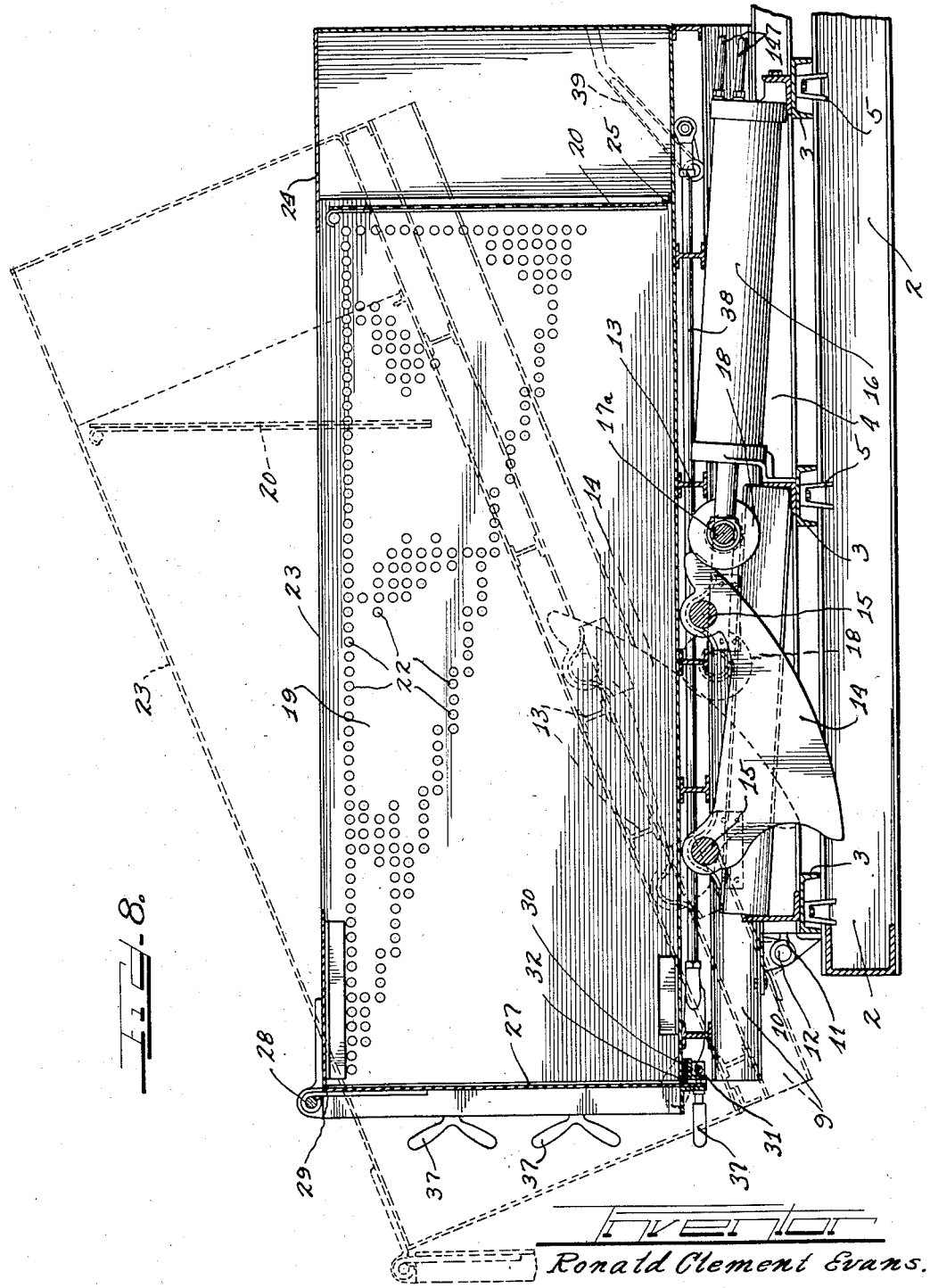

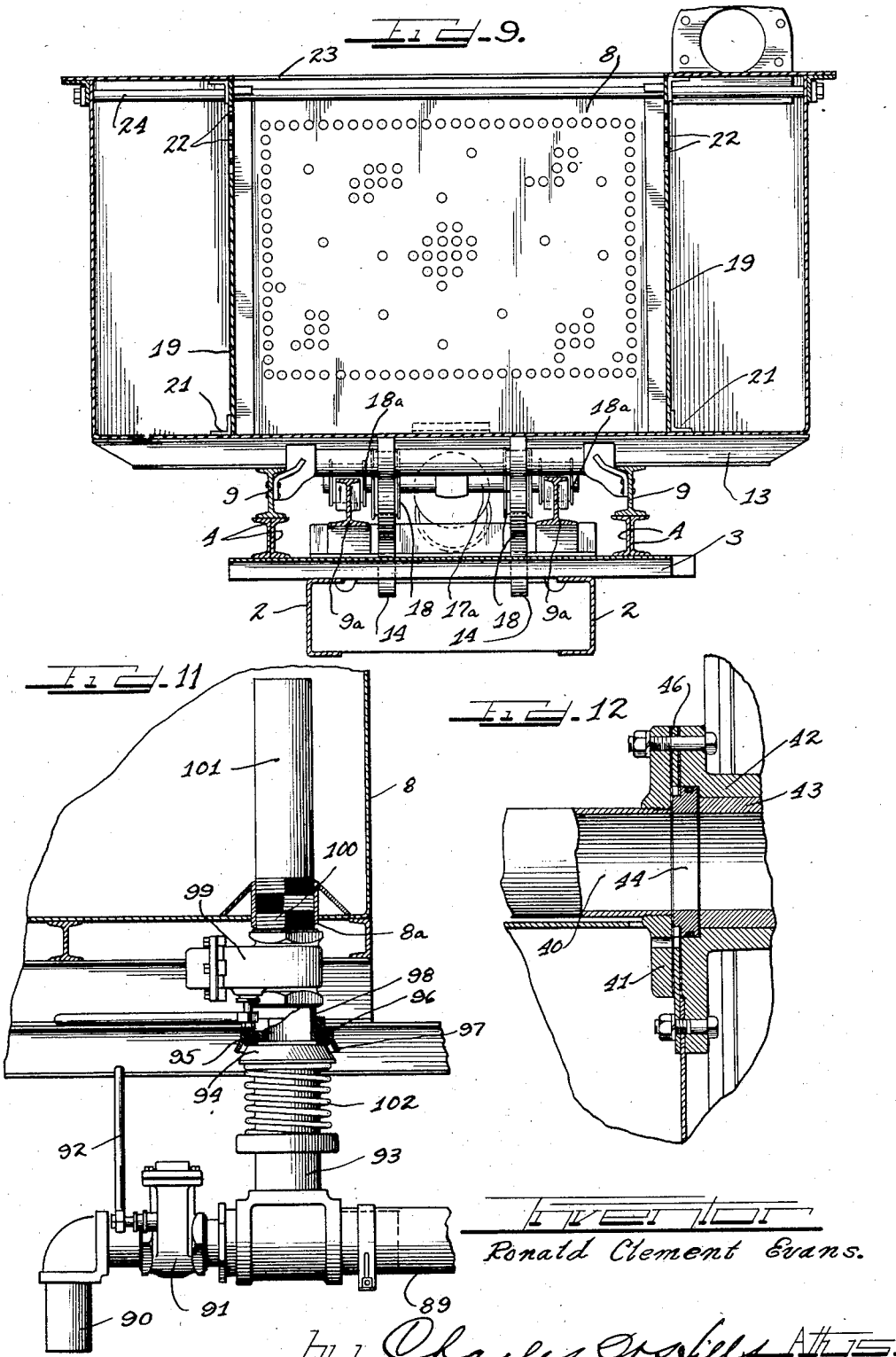

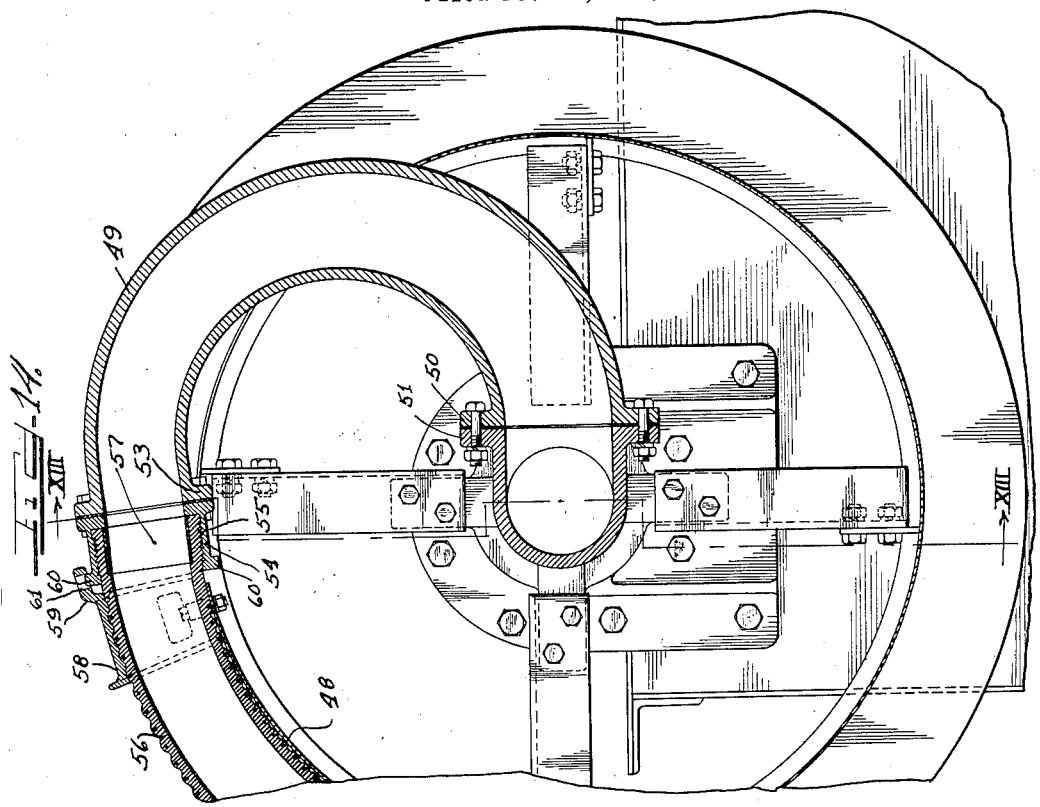

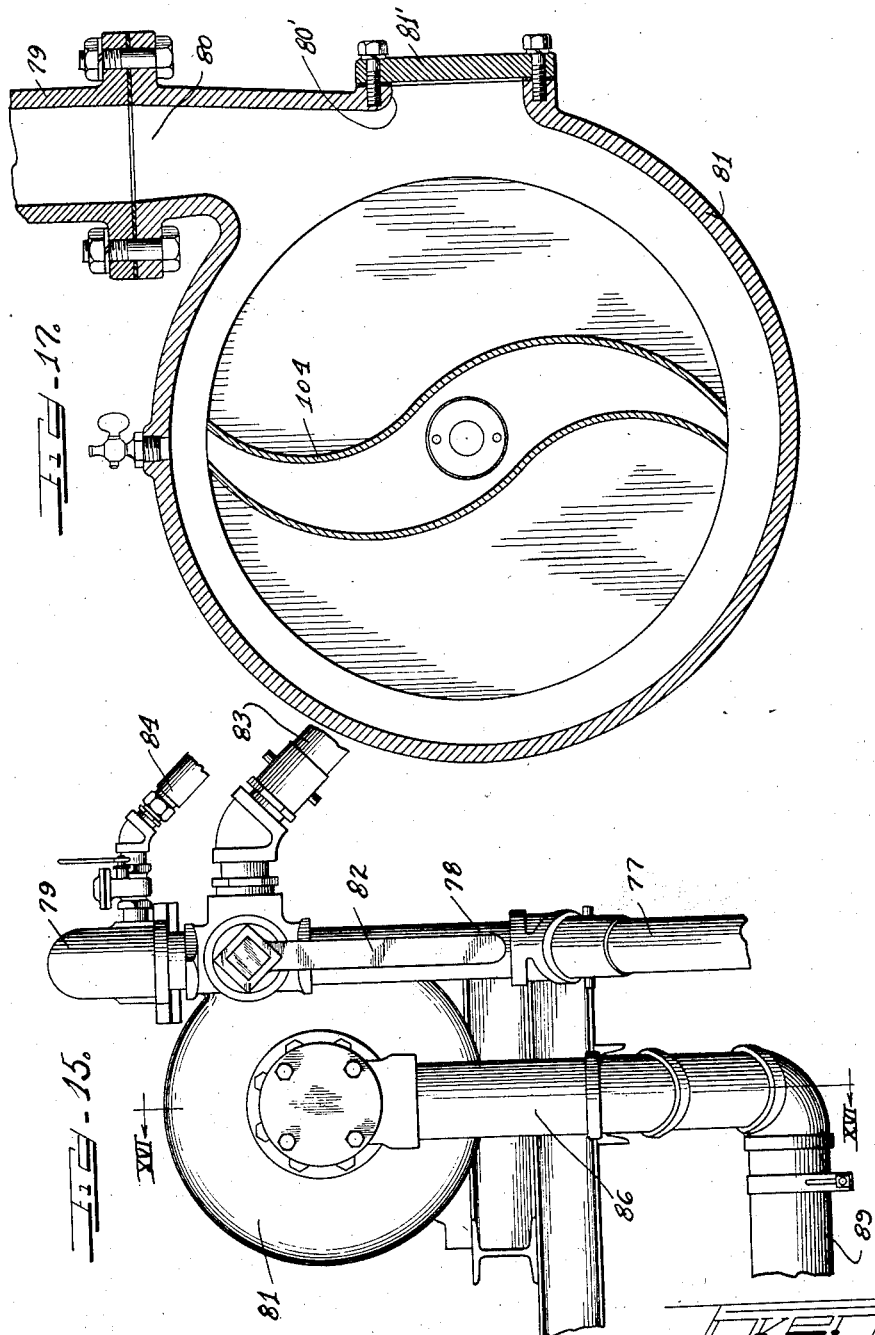

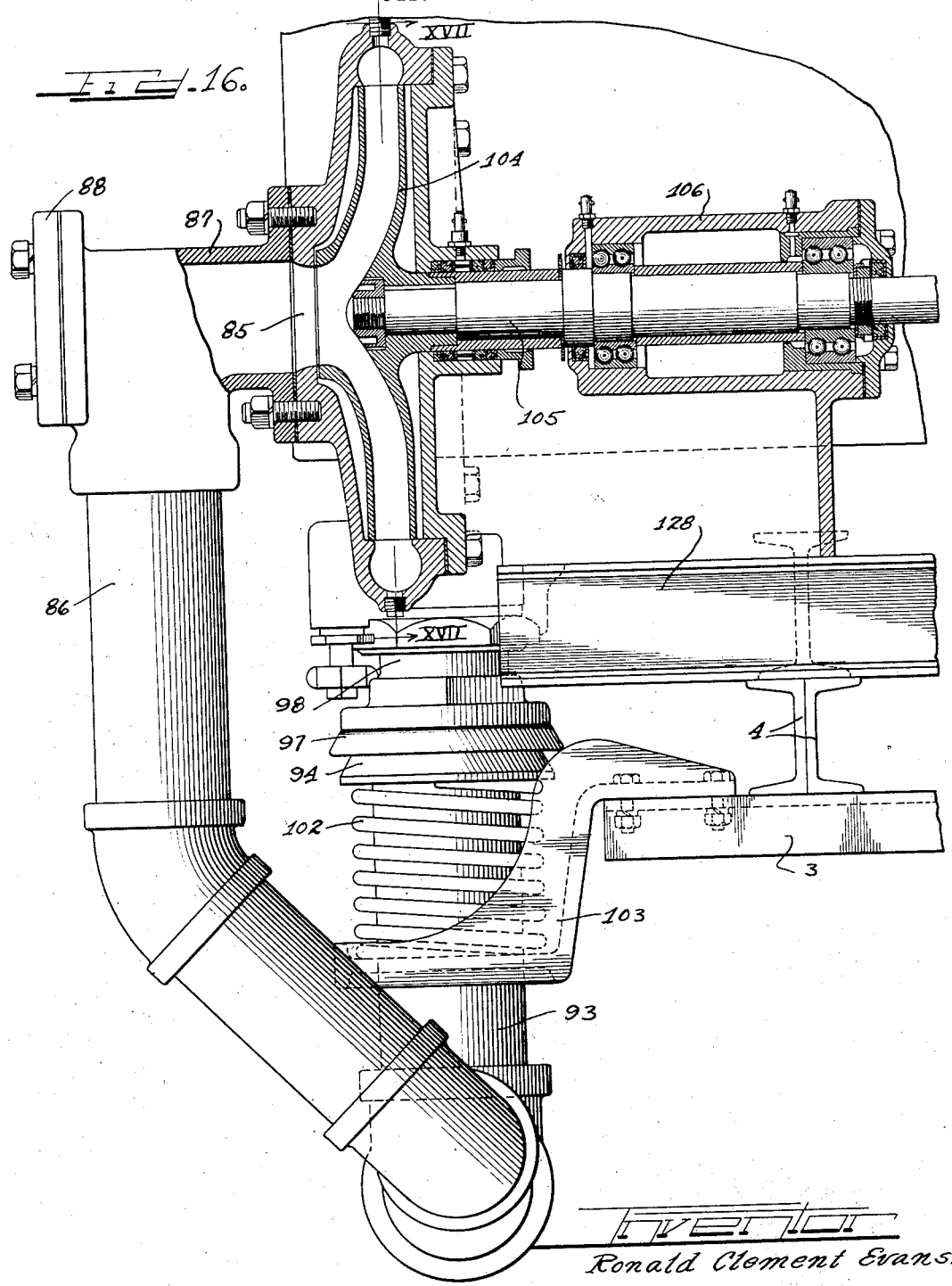

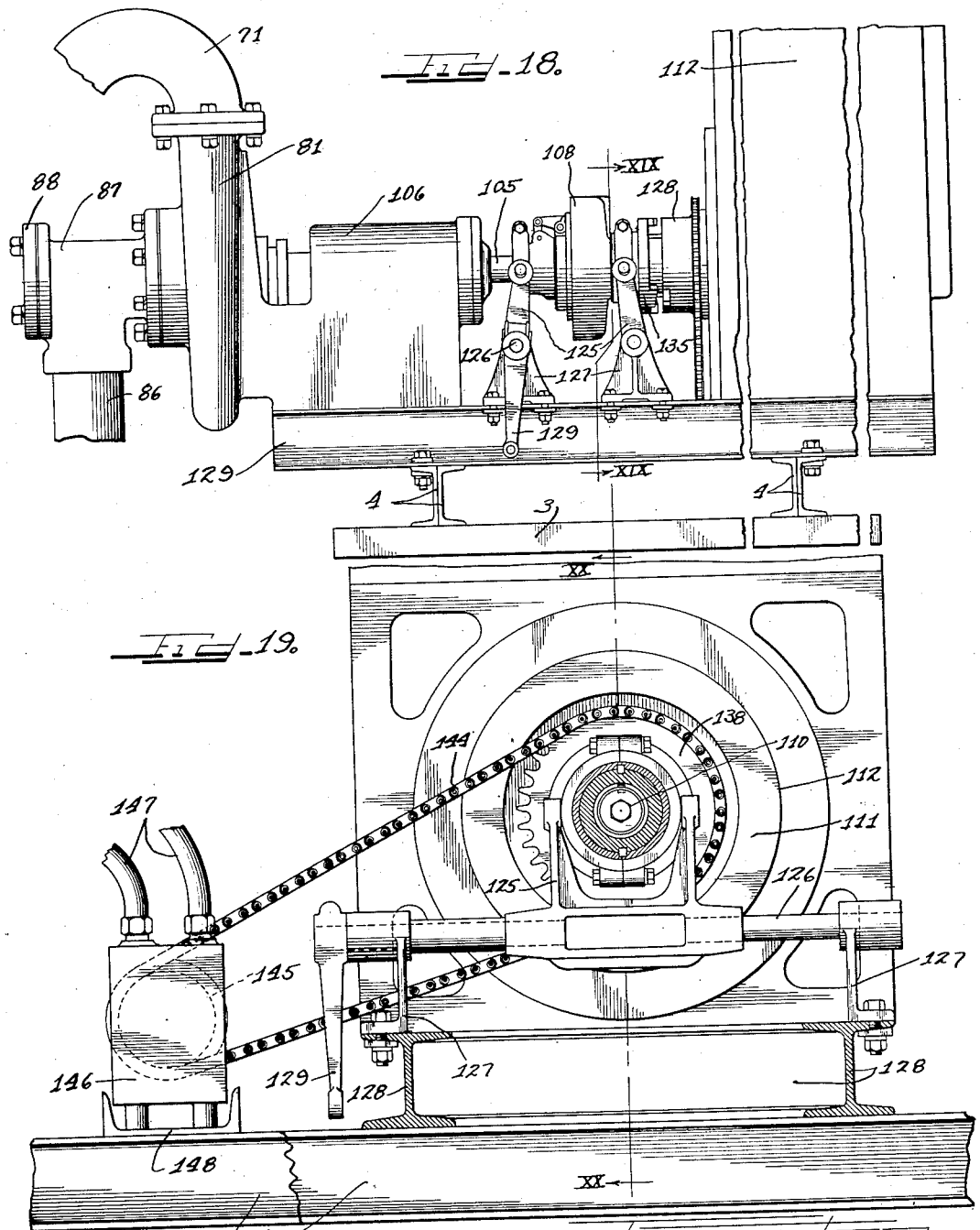

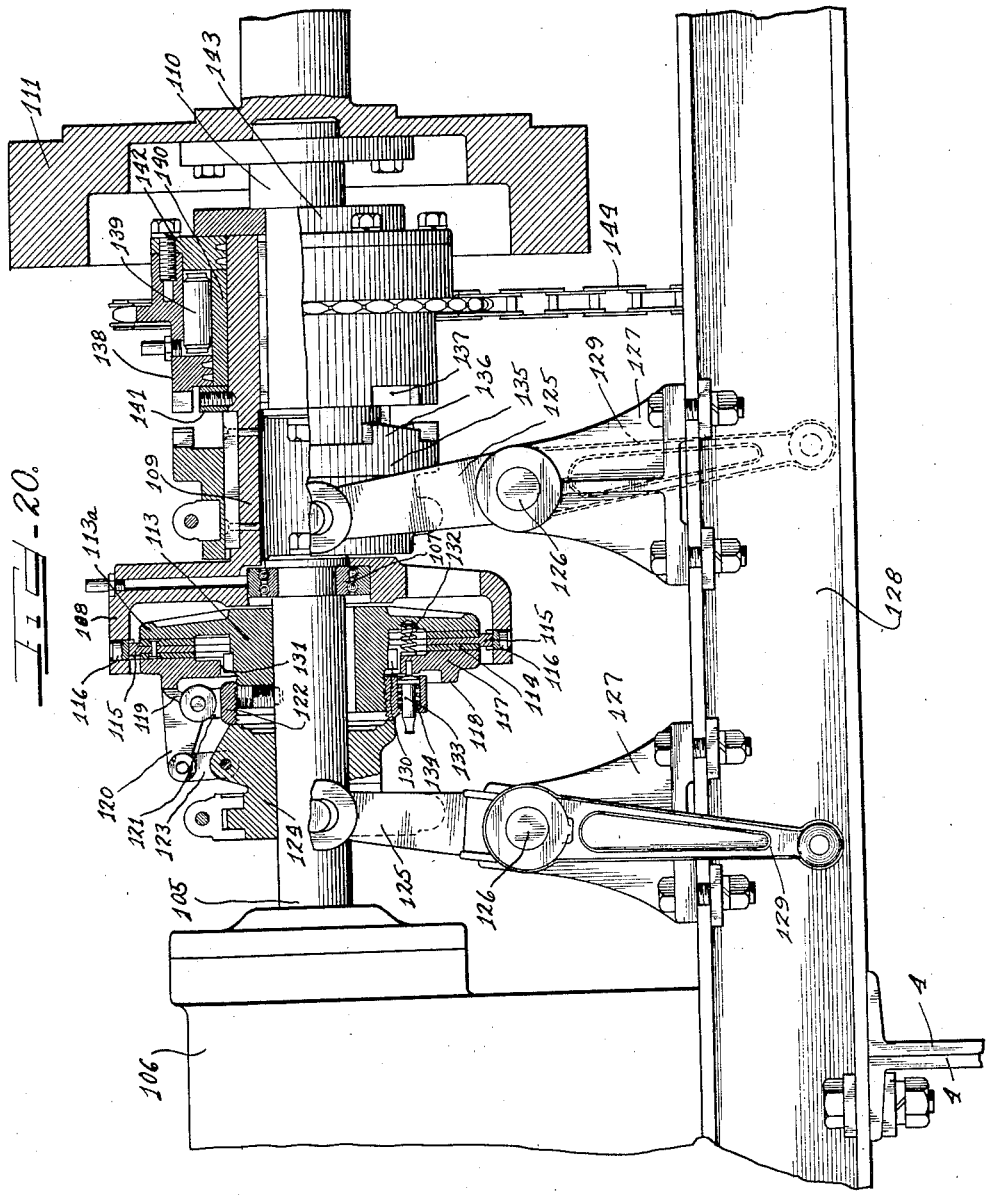

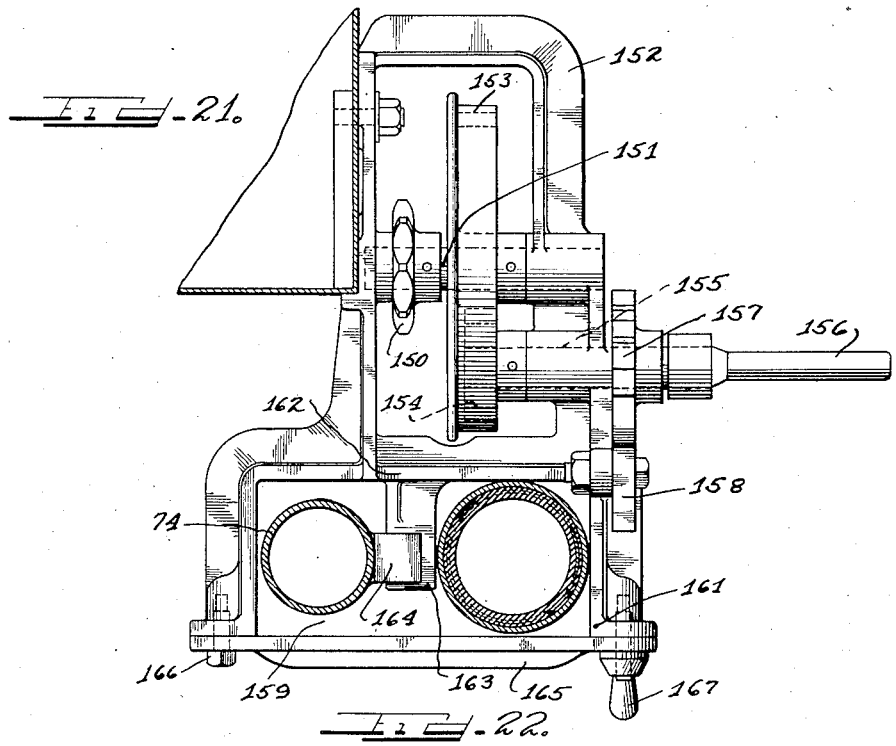
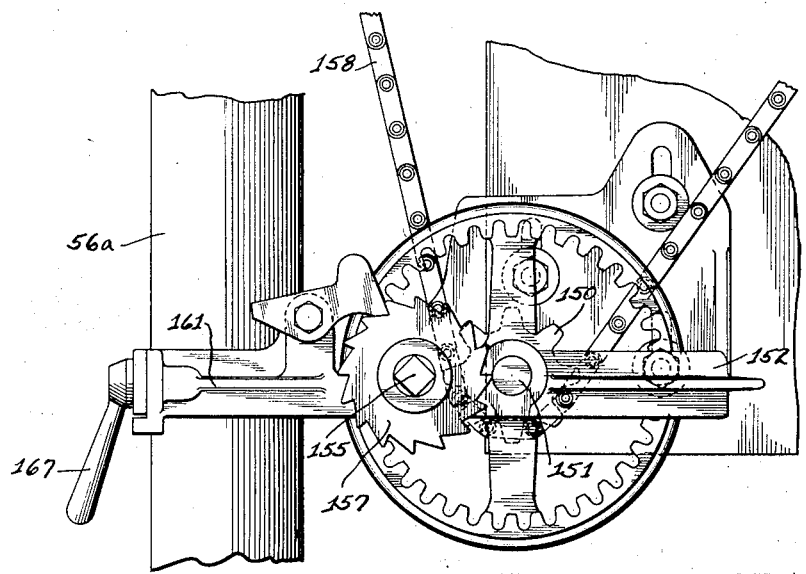

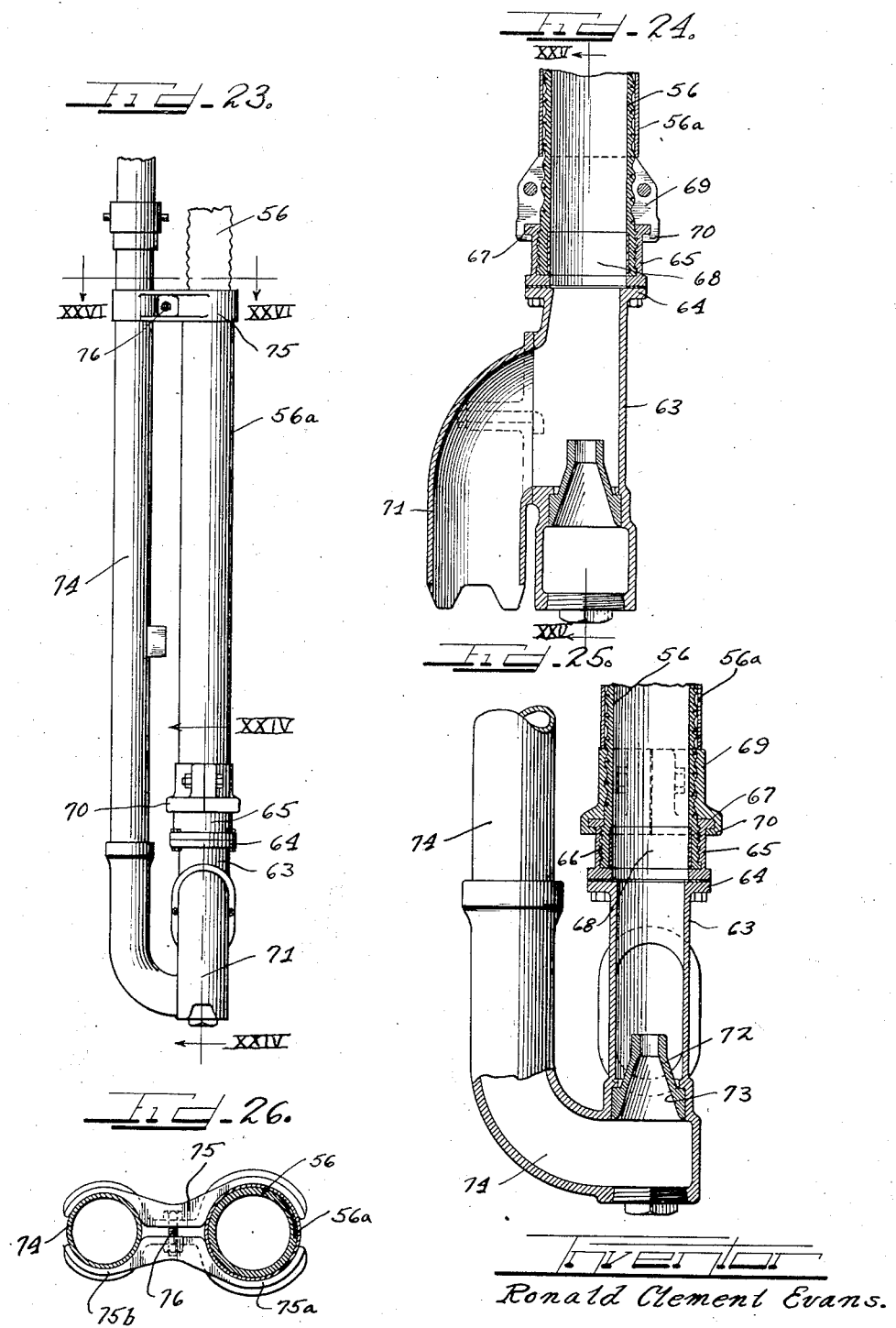

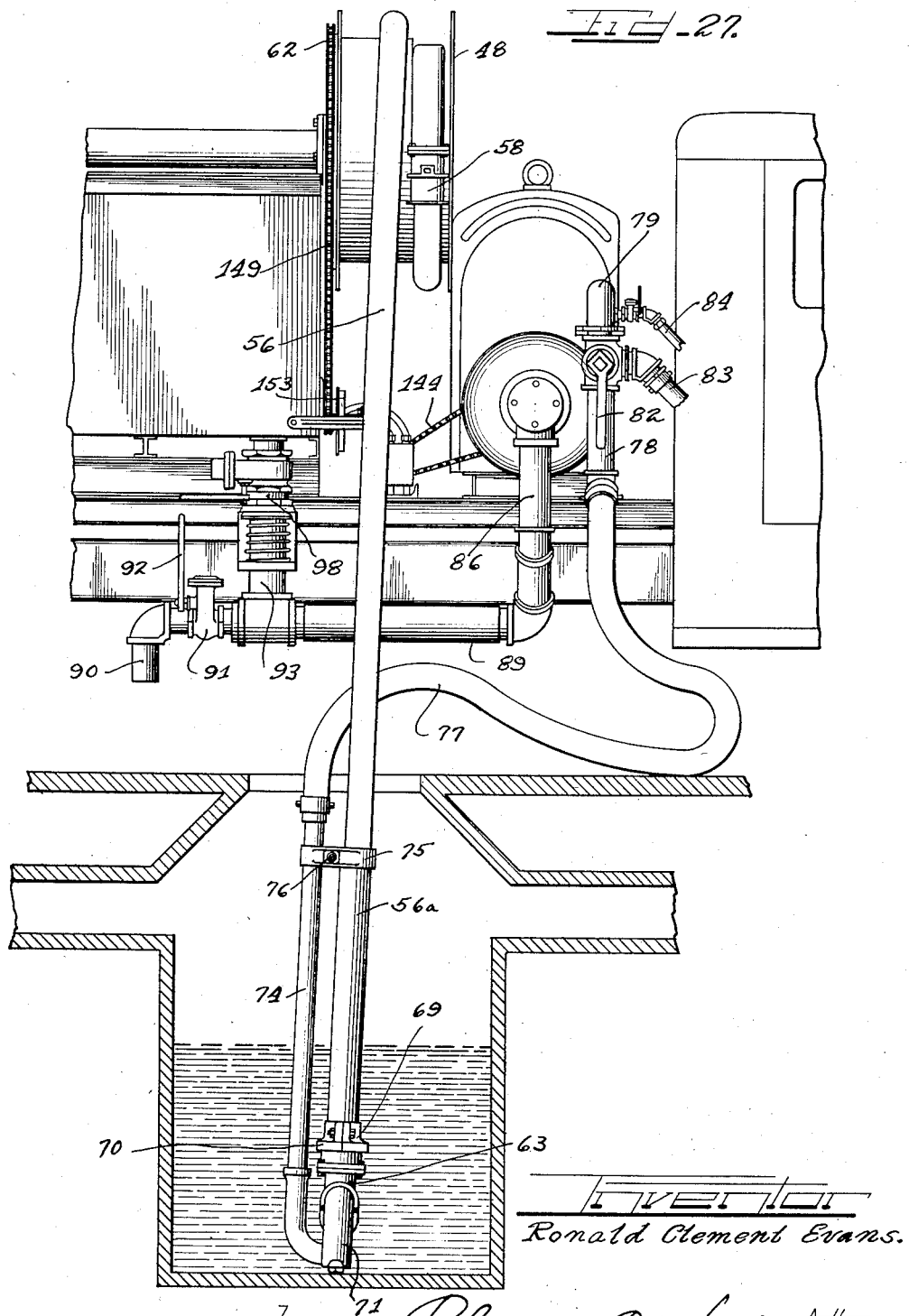

Patented Aug. 6, 1935

2,010,538

UNITED STATES PATENT OFFICE 2,010,538

EDUCTIVE UNIT FOR CLEANING CATCH BASINS

Ronald Clement Evans, Elgin, Ill., assignor to Municipal Appliance Company, New York, N. Y., a corporation of Maine Application December 4, 1933, Serial No. 700,930

17 Claims. (Cl. 214—65)

This invention relates to a hydraulic pumping unit especially adapted for use on vehicles and the like, but also applicable to any other suitable support.

More specifically, this invention relates to a portable eductor for cleaning out catch basins, cess pools, grit chambers and any receptacle containing sludge, grit or dirt laden fluid. It concerns itself primarily with means for pumping or ejecting the sediment in catch basins or sumps or the like, depositing the same in a settling tank of novel construction, separating the fluid used, and re-using the fluid for pumping purposes.

Heretofore it has been necessary in the manufacture of eductor apparatus of the above noted type to construct the apparatus for a specific vehicle chassis. This necessitated either the shipment of the truck chassis to the manufacturer of the eductive apparatus so that the apparatus could be built for that specific chassis, or necessitated the manufacture of the apparatus to conform with the chassis of the specific truck to which it was to be applied and the installation of that apparatus on the truck after shipment to its point of destination.

Inasmuch as truck chassis have frames of varying dimensions, such for example as widths varying from 30" to 42", it will be appreciated that every eductive unit had to be built from a specification which depended upon the dimensions and characteristics of the truck chassis to which the unit was to be applied. Needless to say, specifications for truck chassis are constantly being changed, and unless notice is received of such changes, it frequently happens that the unit is not constructed to conform with the chassis as changed.

Accordingly, it is the aim of this invention to provide an eductor unit which is universally applicable to standard truck chassis and does not require that it be constructed in accordance with the specifications of any standard chassis to which the unit is to be applied.

It is among the objects of this invention to provide such a portable eductor as a unit construction which may be adjusted for different types of vehicle frames when it is to be used in travelling from place to place or which may be affixed to a stationary base when it is desired to appurtenance the same to gas works or sewage plants or the like.

It is a further object of the invention to provide a novel control for such a machine whereby different parts may be independently operated.

It is a further object of this invention to provide a novel support and adjustment for the hydraulic elevator whereby the strain is removed therefrom in its operative position and whereby it may be readily adjusted.

It is also an object of this invention to provide a vehicle having a fluid container with a hose reel having a hose wound thereon with one end connected to the container through the reel.

It is an important object of this invention to provide a unit in which all parts are mounted in proper relation so that no assembling of parts is required upon the job, and in which the eductor hose is always properly connected and requires only a lowering or elevating movement thru the rotation of a reel.

With these and other objects in view which will become more apparent in the following description and disclosures, the invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a side elevational view of my improved eductor mounted upon a vehicle.

Figure 2 is a top plan view of the frame of the eductor mounted upon the frame of a vehicle.

Figure 3 is a sectional view taken upon the line III—III of Fig. 2 looking in the direction of the arrows, and showing parts in elevation.

Figure 4 is an enlarged fragmentary elevational view illustrating the connection between the eductor frame and vehicle chassis taken substantially upon the line IV—IV of Fig. 2, looking in the direction of the arrows.

Figure 5 is an enlarged sectional view taken upon the line V—V of Fig. 3 looking in the direction of the arrows.

Figure 6 is an elevational view of a clamping member used to connect the frames.

Figure 7 is a top plan view of the settling tank.

Figure 8 is an enlarged vertical sectional view thru the settling tank taken in a longitudinal plane and showing parts appurtenanced thereto.

Figure 9 is an enlarged transverse sectional view thru the settling tank.

Figure 10 is an enlarged fragmentary sectional view taken upon the line X—X of Fig. 7 looking in the direction of the arrows.

Figure 11 is a fragmentary elevational view of certain features of construction.

Figure 12 is an enlarged fragmentary elevational view of a seepage bearing constituting a feature of this invention.

Figure 13 is an enlarged sectional view taken upon the line XIII—XIII of Fig. 14 looking in the direction of the arrows.

Figure 14 is an enlarged sectional view taken upon the line XIV—XIV of Fig. 13 looking in the direction of the arrows.

Figure 15 is a fragmentary elevational view of a pumping mechanism that may be used.

Figure 16 is an enlarged part sectional and part elevational view of the pumping mechanism taken upon the line XVI—XVI of Fig. 15 looking in the direction of the arrows.

Figure 17 is an enlarged sectional view taken upon the line XVII—XVII of Fig. 16.

Figure 18 is a fragmentary and broken elevational view of certain features of construction relating to the control of different parts.

Figure 19 is an enlarged sectional view taken upon the line XIX—XIX of Fig. 18 looking in the direction of the arrows and showing parts in elevation.

Figure 20 is an enlarged part sectional and part elevational view of the control mechanism for the hydraulic elevator taken upon the line XX—XX of Fig. 19 looking in the direction of the arrows.

Figure 21 is an enlarged fragmentary elevational view of certain features of construction.

Figure 22 is an enlarged fragmentary elevational view of the control for the adjustment of the hydraulic elevator.

Figure 23 is an elevational view of the hydraulic elevator.

Figure 24 is an enlarged sectional view taken upon the line XXIV—XXIV of Fig. 23, looking in the direction of the arrows.

Figure 25 is a sectional view taken upon the line XXV—XXV of Fig. 24 looking in the direction of the arrows.

Figure 26 is an enlarged sectional view taken upon the line XXVI—XXVI of Fig. 23 looking in the direction of the arrows.

Figure 27 is an enlarged elevational view illustrating the hydraulic elevator.

In referring now to the drawings, it will be noted that the portable eductor has been illustrated as supported upon a vehicle which in the present instance is shown as a motor truck 1 having a frame comprising the parallel channel beams 2 (Fig. 2) that extend in a longitudinal direction as is well known in the art. The eductor frame comprises the transverse inverted channel members 3 which are designed to rest upon the frame members 2. In the instant case, four transverse channel members 3 are shown and upon these channel members are welded or secured spaced sets of channel beams 4, arranged back to back and being longitudinally arranged. Each set of channel members forms an I-beam.

The eductor frame comprising the channel member 3 and the I beams thereon is adapted to be adjustably clamped to the vehicle frame by means of the clamping members 5. In the illustrated embodiment of the invention, a pair of clamps 5 are connected to each transverse channel member by means of a bolt 6. The clamps on each channel 3 are suitably spaced for association with the channel beams 2. The clamps are best shown in Figs. 4, 5 and 6 and in referring to these figures, it will be observed that each clamp has a heel portion 5a that engages beneath the web of a channel member 3. The heel portion 5a merges into a horizontally extending portion 5b thru which the bolt 6 extends. The horizontally extending portion 5b merges into a pendant portion 5c which has a bevelled or cam shaped toe 5d extending at a right angle thereto for engaging beneath the upper flange of the adjacent channel beam 2. It will be appreciated that by tightening the nuts on a bolt 6, the clamp 5, held thereby, will readily adjust itself to any inequalities in the structure of the frame and firmly grip the frame members. Due to the fact that each transverse channel member is firmly anchored to each channel beam 2, it will be evident that the eductor frame is firmly secured to the vehicle frame, and due to the fact that the clamps may be readily loosened, it is possible to longitudinally adjust the eductor frame and quickly clamp the same in its adjusted position.

The rear end of the vehicle frame includes a transverse channel 7 (Fig. 3) which fits between the flanges of the channel beams 2. The rear end clamps 5 are designed to engage the upper flange of the transverse channel 7 as shown in Fig. 3 with the result that the eductor will not slide off the vehicle frame; the clamps 5 and channel flange forming coacting shoulders for arresting the eductor frame from sliding rearwardly when the same is tilted.

The base of a settling tank 8 is pivotally supported upon the beams 4—4 as shown more clearly in Figs. 1 and 8. The base of the settling tank consists of the longitudinally extending I beams 9 each of which has a hinge plate 10 secured to the bottom thereof. Upon the rear ends of the I beams 4, are secured hinge plates 11 which project beyond the said I beams. The hinge plates 10 and 11 have registering apertures 12 for receiving a pivot rod. To the I beams 9 are welded or secured the transverse I beams 13 to which the settling tank 8 is fastened.

The settling tank is adapted to be tilted upon its pivotal connection with the eductor frame as shown in dotted lines in Fig. 8. To this end, cam members 14 are secured to the base of the setting tank at approximately the center thereof in any suitable manner. In the present instance, the cam members are shown as secured at their ends to rods 15 secured to the I beams 9. A fluid cylinder 16 secured to the eductor base is provided with a piston rod 17 carrying a rod 17a upon which rollers 18 are journalled (Figs. 8 and 9) for engaging the cam members 14. The rod 17a carries guide rolls 18a (Fig. 8) that travel upon tracks 9a.

The settling tank 8 which may be made of metal or any suitable material is wider at its rear than at its front as shown in Fig. 7. This will cause the sides to diverge and facilitate the dumping of the tank when it is tilted for such a purpose. Within the settling tank, there is formed a chamber for receiving the sediment. This chamber is formed by the rear wall of the tank, a pair of rearwardly diverging plates 19, and a front plate 20. The plates 19 are secured to the bottom of the tank by means of angle brackets 21 and they are provided with perforations 22 which cover substantially a triangular area as shown in Fig. 8, the apex of which lies in the upper rear portion of the tank. The lowermost apertures lie in a horizontal plane that coincides substantially with a diagonal extending from the upper rear corner of the tank to the lower forward corner. This plane constitutes approximately the angle of repose of the sediment. In other words, the upper surface of the sediment will slope downwardly from the rear to the front. The water in the sediment will escape thru the perforations 22.

The tank is provided with a cover member 23 and beneath such cover there is a transverse rod 24 best shown in Fig. 9 that extends thru the sides of the tank. The plate 20 which is also perforated as shown in Fig. 9 is hinged to the rod 24. An angle clip 25 (Fig. 8) on the bottom of the tank forms an abutment for the lower edge of the plate 20 when the same is in a substantially vertical position. Thus the plate 20 can only swing rearwardly from a vertical position. It will be noted that the plate 20 is spaced a short distance from the front wall of the tank thereby providing a compartment with such front wall. The cover 23 of the tank is provided with a door 26 above such compartment which may be opened so that rocks or coarse matter may be manually deposited in such compartment. When the tank is tilted, the plate 20 will be forced to swing rearwardly to allow such rocks or coarse matter to pass thereunder.

The rear wall of the tank is in the form of a hinged discharge door 27. A rod 28 which is suitable anchored to the top of the tank forms the hinge support for the door which is provided with hinge straps 29 embracing such rod.

In order to provide a seal between the door 27 and the tank, filler blocks 30 (Figs. 8 and 10) are welded to the bottom and sides of the tank at a short distance from the rear ends. Angle members 31 are secured over the filler blocks, and in the spaces between the angle members and walls of the tank are flexible sealing strips 32 which preferably consist of rubber or some similar material. It will be noted from Fig. 10 that these sealing strips extend slightly beyond the rear edge of the tank so that the same must be engaged by the discharge door.

The sides and bottom of the discharge door 27 are adapted to be firmly clamped against the sealing strips 32. To this end, suitable bolts 33 provided with terminal loops or eyes 34 are pivoted to blocks 35 secured in the angle members 31. These bolts are shown as passing thru slots 36 formed in the margins of the angle members 31 and the door 27. Wing nuts 37 threaded upon these bolts are adapted for engaging the door and clamping the same against the sealing strips 32. When it is desired to open the discharge door 27 it is necessary to loosen the nuts 37 and swing the bolts 33 thru the slots 36. The door 27 is also held in its closed position by a clamping rod 38 (Fig. 8) which is adapted to be actuated by a lever 39. When the bolts 33 are loosened and swung thru the slots 36 the lever 39 may be actuated to release the door. The clamping rod 38 and lever 39 are old in the art and are not specifically illustrated.

The sediment which is usually saturated with water is deposited into the rear part of the settling tank by means of a pipe 40 (Figs. 1 and 7) which extends thru the cover. The water which drains from the sediment passes from the settling tank thru an opening 8a in the bottom of the tank to a pump for reuse as will later appear.

The forward end of the sediment discharge pipe 40 extends into a flange 41 (Figs. 12 and 13). This flange 41 is bolted to a hollow sleeve 42 which forms an external bearing for an interior sleeve 43. A cork ring 44 is positioned between the inner end of the sleeve 43 and the flange 41, the sleeve bearing 42 being suitably rabbeted to receive such cork ring. Screws 45 may be used to attach the cork ring to the end of the rotatable sleeve 43. A plate or packing 46 may be placed between the flange 41 and the sleeve 42. This packing 46 is provided with an enlarged opening that extends beyond the cork ring 44. The flange 41 is provided with an aperture or water outlet port 47 communicating with said opening. With this construction, water can seep between the cork ring and flange 41 and escape thru the port 47 and wash or flush away any sediment that may creep between the flange and the cork ring.

The sleeve 43 which rotates in the bearing 42 carries a reel 48 which is modified for receiving a curved pipe section. The lower end of this pipe section is provided with an annular flange 50 which is bolted to a substantially annular flange 51 upon the rotatable hollow bearing sleeve 43 which is provided with an inlet port 52 in registry with the curved pipe section 49.

The upper end of the curved pipe section 49 is provided with a flange 53 to which is bolted a sleeve 54 having internal serrations 55. An armored hose 56 which has a plain rubber end extending into the sleeve 54 is fastened thereto by an expander ring 57 which forces the plain rubber end to become imbedded in the serrations. A clamp 58 which has an arcuate portion fitting over the upper surface of the armored hose 56 is provided with an upwardly offset slotted portion 59 for engaging a flange 60 upon the sleeve 54. It will be noted that the slot 61 in the clamp 58 is designed to receive a portion of the flange 60. The clamp 58 is provided with downwardly extended portions bolted to the reel as shown in dotted lines in Fig. 14. According to this construction any strain upon the armored hose is transmitted to the clamp 58 and sleeve 54. The reel 48 is provided with a sprocket wheel 62 whereby the same may be rotated. From its attachment to sleeve 54, the armored hose encircles the reel a few times with the free end extending downwardly.

The lower end of the armored hose is connected to a metal pipe 63 as shown more clearly in Figs. 24 and 25. The pipe 63 has a flange 64 to which a sleeve 65 is connected. The sleeve 65 has interior serrations 66 and a terminal rib 67. The armored hose 56 has an unarmored lower end extending into said sleeve, and an expander 68 within the hose expands the same against the serrations 66 to cause the latter to bite into the rubber. A split collar 69 is clamped around the lower end of the armored hose. The lower end of this collar 69 has an internally grooved enlargement 70, the groove of which receives the rib 67. Thus the weight of pipe section 63 is transmitted to the coupling sleeve 69 which surrounds the armored portion of the base. Thuswise a stronger and more rigid connection is secured. A hollow metal pipe 56a protects the armored hose for a suitable distance above the nozzle section 63.

The pipe section 63 has an offset pipe portion 71 thru which the sediment is sucked. The lower end of the section 63 has a restricted valve or jet nozzle 72 formed by a converging wall 73 and a pressure pipe 74 is connected to such lower end. It will be obvious that if a fluid is forced thru the pressure pipe and thru the jet nozzle, a vacuum will be created for sucking the sediment thru the offset pipe portion 71. The pressure pipe is connected to the discharge pipe by a clamp 75 shown more clearly in Fig. 26. This clamp 75 consists of two complementary sections each of which is formed with a pair of arcuate portions 75a and 75b interiorly corrugated for engaging the two pipes. The complementary sections are clamped against the pipes 56 and 74 by a bolt 76 located between the arcuate portions.

The pressure pipe 74 is connected to a flexible hose 77 (Figs. 1 and 27) which is connected to a pump outlet pipe 78 which has a curved upper portion 79 bolted to a flanged opening 80 in the pump casing 81 supported upon a supplemental frame mounted upon the eductor frame as shown in Fig. 17. The pipe 78 has a three way cock controlled by a handle 82 and a water supply pipe 83 extends from the valve. The pipe 83 may be connected to any water supply for supplying the system before operations begin. The three way valve may be adjusted to admit water from the pipe 83. It may also be adjusted to shut off the water thru pipe 83 and establish communication thru the ejector hose, or it may be closed to prevent flow into or from the pump. The upper curved portion of the pipe 79 has a connection with a jet pipe 84 which is adapted to extend into the catch basin for agitating the sediment.

The center of the pump casing 81 has an opening 85 (Fig. 16) that communicates with a pipe 86 which has an L-shaped head portion 87 bolted to the center portion of the pump casing. This L-shaped head is preferably provided with a removable end cap 88 for access to the pipe.

The pipe 86 connects with a horizontal pipe 89 that is provided with a drain nozzle 90 at its free end. A valve 91 controlled by a handle 92 is located adjacent the nozzle 90 to either shut off any drain from the pipe or to allow the same to drain. A short vertical pipe 93 is connected to pipe 89 between the valve and the pipe 86.

In referring to Fig. 11, it will be noted that the upper end of pipe 93 is provided with a bevelled head 94 which is normally pressed against a sealing ring 95 located in a groove 96 in a metal hood 97 which is formed on a short pipe section 98 which is connected to a valve housing 99 which in turn is connected by a hollow threaded member 100 to a stand pipe 101 secured in the aforementioned opening 8a in the bottom of the tank.

The bevelled end 94 of the pipe 93 is normally forced against the sealing ring 95 by means of a coil spring 102 surrounding the pipe and supported at its lower end upon a bracket 103 (Fig. 16) attached to a transverse channel 3 of the eductor frame. The upper end of said spring engages beneath the bevelled head 94 of pipe 93 and forces such head against the sealing ring. With this construction, the settling tank can be readily tilted without affecting the pipe 93.

In referring now to Figs. 16 to 20, it will be observed that the pump rotor 104 within casing 81 is secured to the end of a pump shaft 105 journalled in the pump casing and in a bearing 106 constituting a part of the pump casing. The pump shaft 105 extends beyond the bearing 106 and its free end is journalled in a ball bearing 107 located in a friction clutch housing 108 shown in section in Fig. 20. The housing 108 has a sleeve 109 that extends in an axial direction and is splined to a driving shaft 110 connected with the fly wheel 111 of a motor 112.

It should be noted that access may be had to the interior of the pump casing 81 and the rotor 104 through a cleanout opening 80' normally covered by a detachable closure plate 81' bolted to the casing. By aligning an end of the rotor with the opening 80', a cleanout rod may be inserted into the interior of the rotor.

Within the friction clutch housing, there is a flanged member 113 secured to the pump shaft 105. A built up friction plate member 114 is adapted to engage the flange 113a of the member 113. This friction member has a plurality of radially extending studs 115 that are located in bifurcations in the inner ends of guide pins 116 secured in the housing 108. This feature maintains the friction member in proper position with provision for sliding movement. A plate member 117 surrounds the hub of the flanged member 113 and means are provided for pressing the plate against the friction plate member 114 for causing the latter to engage flange 113a. To this end the member 117 has a laterally projecting rib 118 upon its outer surface adapted to be engaged by a shoulder 119 on a lever 120 pivoted upon a lug 121 projecting from a ring member 122 threaded for adjustment upon the hub of the flanged member 113. The lever 120 is connected by a link 123 to a slidable sleeve 124 on the shaft 105. A yoke lever 125 is pivotally attached to the sleeve 124 at its upper end while the lower end thereof is secured to a shaft 126 journalled in a bracket 127 secured upon a frame member 128 resting upon the channel I beams 4—4. A lever 129 secured to shaft 126 is adapted to rotate the shaft for actuating said lever 125. If desirable, the plate 117 and the hub of friction member 113 may have interfitting teeth 130 and 131.

Between the pressing plate member 117 and the friction member 113 are coil springs 132 for releasing the friction clutch members. A pin 133 slidably mounted in a cavity in ring 122 is connected to the pressing plate 117. A coil spring 134 surrounding the pin in the cavity engages an annular shoulder 135 on the pin for urging the pin on pressing plate against the friction elements. It will be understood that any number of pins 133 may be used, and that any desired number of levers 120 may be used.

The above described friction clutch controls the eductor pump. A jaw clutch is also connected to the motor shaft for operating the hoisting mechanism for the settling tank, so each can be independently controlled. This jaw clutch comprises a slidable clutch member 135 actuated by a yoke lever 125 secured upon a shaft 126 which is actuated by a lever 129 in the same manner as the friction clutch is engaged. The clutch member 135 is slidably splined upon the sleeve 109 and is provided with clutch projections 136 adapted for entering clutch recess 137 in the hub of a sprocket wheel 138 journalled upon the sleeve 109.

The sprocket wheel 138 is journalled upon a roller bearing 139 having an inner sleeve 140 surrounding the sleeve 109. A ring 141 surrounds the sleeve 109 and forms an end abutment for the sleeve 140 and the sprocket wheel 138. Upon the opposite side of the hub of the sprocket wheel, there is attached a ring member 142 that extends between the right hand end of sleeve 140 and a collar 143 secured upon the shaft 110 adjacent the right hand end of sleeve 109. This construction maintains the sprocket wheel in position against longitudinally shifting movements.

A sprocket chain 144 is trained over the sprocket wheel 138 and over a sprocket wheel 145 (Fig. 19) connected to a fluid pump 146 supported upon the frame members 128. The pump 146 which may be of any suitable known construction is shown as having a pair of flexible hose 147 connected to the fluid pressure cylinder 16.

The drive for the fluid pump comes indirectly from the motor which is shown as mounted upon a frame supported upon the eductor frame. The motor supporting frame or base comprises the I-beams 128 mounted upon the I-beams 4—4 so that the unitary feature is completely maintained. The fluid pump 146 is supported upon a channel bar 148 supported upon the I-beams 4—4 thereby preserving the proper relation between the motor and such fluid pump.

Mechanism has been provided for rotating the reel 48 when it is desired to raise the hydraulic elevator or eductor pipes. To this end, the sprocket wheel 62 upon such reel has trained thereover a sprocket chain 149 which is also trained over a sprocket wheel 150 (Figs. 21 and 22) secured upon a shaft 151 journalled in a casing 152 supported upon the eductor frame. An internal gear wheel 153 is secured upon the shaft 151. This internal gear is adapted to be driven by a pinion 154 (shown in dotted lines in Fig. 21) secured upon a manually rotatable shaft 155 journalled in the casing and provided with a hand crank 156 at its outer end.

In order to prevent reverse movement of the shaft 151, a ratchet wheel 157 is secured upon shaft 155 and is engaged by a pawl 158 pivoted to the casting. To lower the hydraulic elevator, it is of course necessary to disengage the pawl from the ratchet.

The casting 152 is provided with a rectangular recess 159 (Fig. 8) formed by arms 160, 161 and a web 162. A horizontal support 163 extends from the web 162 for engagement by a lug 164 upon the pipe 74 of the hydraulic elevator when the same is elevated. The recess 159 is normally closed by a bar 165 which is pivoted to the bar 160 by means of a bolt 166 for upward and downward swinging movements. A removable pin 167 secures the bar 165 to the bar 161. It is of course necessary to remove the pin 167 and swing the bar 165 clear of the recess in order to allow the hydraulic elevator to enter such recess when the same is elevated by the hoisting mechanism previously described. It is also necessary that the hydraulic elevator be raised until the lug 164 is above the horizontal support 163 before it is pushed into such recess 159. Thus the hydraulic elevator is securely confined and supported in its elevated position when not in use.

When travelling to a catch basin that is to be cleaned out, the hydraulic elevator will be supported and confined as shown in Fig. 21. When it is desired to lower the same into the catch basin, the bar 165 is uncoupled by removing the pin 167 and is swung out of the way to allow the hydraulic elevator to be moved laterally from support 163 for lowering purposes. The pawl 158 is then disengaged from the ratchet whereupon the hydraulic elevator may be lowered by gravity.

If the clutches are not in proper position, the friction clutch should be disengaged and the jaw clutch should be engaged. Then the motor may be started for operating the eductor pump, provided of course that the system has already received the proper amount of water from some hydrant. The eductor pump will elevate the sediment in the catch basin thru the hydraulic elevator and deposit the same in the settling tank. The solid material will settle in the bottom of the tank in the form of an inclined mass as previously set forth. The water from the sediment will escape thru the stand pipe for reuse.

When it is desired to empty the settling tank, the rear wall thereof is released as explained and the jaw clutch is engaged and the friction clutch is disengaged whereupon the motor will operate the hoisting pump 146 for supplying fluid under pressure to the hoisting cylinder 16 for tilting the settling tank as previously explained. When the hoisting pump is shut down by disengaging the jaw clutch, the settling tank will gradually return to its normal position.

When it is desired to raise the hydraulic elevator from the catch basin, the hand crank 156 should be rotated for rotating the reel 148 and winding the hose thereon.

It will be appreciated that the eductor unit with all parts in proper position may be readily mounted upon any suitable vehicle or upon a stationary base. With the eduction hose carried by a reel, it becomes a simple matter to lower or elevate the same. Further in such a construction, the eductor hose is always properly connected and requires no connections on the job. It will further be appreciated that a single motive power is used to operate the eductor pump, and tilt the settling tank independently of each other.

It should be noted that while I have illustrated a settling tank of my own design, another settling tank of any well known construction of the prior art may be substituted therefor in the event a different tank is desired.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In an eductor, a unit adapted to be mounted on a vehicle and comprising a settling tank and pumping means; a hydraulic elevator connected to said tank and pumping means, a reel carried by and discharging into said tank upon which reel a portion of said elevator is mounted, means for operating said reel for elevating said hydraulic elevator and means other than said reel for supporting said hydraulic elevator in elevated position.

2. An eductor unit adapted to be mounted on a vehicle comprising a frame, a tiltable tank upon said frame, a pump upon said frame, a hydraulic elevator including an ejector head and a hose portion connected to said tank and pump, a reel above said frame upon which the hose portion of said elevator is wound, said reel having a discharge tube therein connected to said hose portion and being so connected to said tank as not to require that the reel and hose portion be disconnected from the tank when the tank is tilted on said frame and means for rotating said reel for elevating said hydraulic elevator, said ejector head being suspended from said reel when in use so as to exert a force tending to unreel the hose portion whereby the unreeled part of the hose portion may be held taut between the reel and the ejector head.

3. An eductor unit adapted to be mounted on a vehicle comprising a frame, a tiltable tank upon said frame, a hollow shaft journalled upon said tank, a pipe extending from said tank and communicating with said hollow shaft, a reel supported upon said hollow shaft and having a tube communicating with said hollow shaft, a hydraulic elevator including a fluid operated ejector connected to said tube for discharging into said hollow shaft, and pumping mechanism connected to said hydraulic elevator for forcing fluid therethrough up to said reel and into said tank.

4. In an eductor, a unit comprising a base, a tiltable tank upon said base, a pumping mechanism upon said base, a hydraulic elevator including a fluid operated ejector connected to said pumping mechanism, a reel upon said tank, said hydraulic elevator being wound upon said reel, a connection between said hydraulic elevator and tank extending axially thru said reel, said reel being movable with said tank so as to enable said connection to remain intact, and means for operating said pumping mechanism to force fluid through said elevator ejector up to said reel and into said tank.

5. In an eductor adapted to be mounted on a vehicle, an elevated support, a hydraulic elevator including a flexible hose having means for engaging said support by a lateral movement, hoisting mechanism including a reel upon which said hose is adapted to be wound for raising said elevator whereby said means may be brought into engagement with said support when said elevator is not in use, means for maintaining said hydraulic elevator upon said support and means operatively connected to said hoisting mechanism for holding the unreeled portion of the flexible hose in a given suspended position when the elevator is not in engagement with said support.

6. In an eductor unit, a frame, a tiltable tank upon said frame, a pipe extending from said tank, a stationary bearing for receiving the free end of said pipe, a reel having a hollow hub mounted in said bearing, said reel having a hollow arm communicating with said hollow hub, a hydraulic elevator having a flexible portion wound upon said reel and connected to said arm, and means providing for seepage of fluid between said hub and bearing and inside of said tank.

7. A portable eductor unit applicable in its entirety and without any substantial change therein to a vehicle chassis or any other suitable support, comprising a frame, a settling tank pivotally carried thereon, hoisting means between said tank and said frame and carried by the frame for elevating an end of said tank to discharge the contents thereof, a hydraulic elevator connected to said tank, and a prime mover carried by said frame for actuating said hoisting means and said elevator said elevator including a hose and a reel therefor supported between the tank and said prime mover.

8. A portable eductor unit applicable in its entirety and without any substantial change therein to a vehicle chassis or any other suitable support, comprising a frame, a settling tank pivotally carried thereon, hoisting means between said tank and said frame for elevating an end of said tank to discharge the contents thereof, a hydraulic elevator connected to said tank, and a prime mover carried by said frame for actuating said hoisting means and said elevator, said hydraulic elevator including a hose reel carried by the tank, a hose connected to said reel, an eductor nozzle carried by said hose, a pump for actuating fluid in the elevator, and conduit means between said hose, said pump and said tank.

9. In a vehicle, a tiltable fluid container, a hose reel, a hose having an end connected to and adapted to be wound on the reel, said end on said reel also being connected to the interior of said container, said reel being mounted on said container and having a conduit with one end in communication with said end of the hose and its other end in communication with the interior of the container and means for tilting the container and thereby to raise said reel and conduit.

10. In a vehicle, a tiltable fluid container, a hose reel, a hose having an end connected to and adapted to be wound on the reel, said end on said reel also being connected to the interior of said container, said reel being mounted on said container and having a conduit with one end in communication with said end of the hose and its other end in communication with the interior of the container, said conduit including as a section thereof a hollow spindle comprising a part of said reel and being rotatably carried by the container and means for raising said reel and conduit by the tilting of said container.

11. In a vehicle, a fluid container, a hose reel, a hose having an end connected to and adapted to be wound on the reel, said end on said reel also being connected to the interior of said container, said reel being mounted on said tank and having a conduit with one end in communication with said end of the hose and its other end in communication with the interior of the container, said conduit including as a section thereof a hollow spindle comprising a part of said reel and being rotatably carried by the container, said spindle having a gland disposed in the interior of said tank and through which a small amount of fluid may pass into the interior of the tank.

12. In a vehicle having an eductor thereon, a fluid container, a hose reel, said hose reel having therein a central conduit consisting of a fixed axial tube discharging directly into said container, a hose having an end connected to and adapted to be wound on the reel, said end on said reel also being connected to the interior of said container, and an eductor nozzle head carried by another end of said hose so as to be suspended from said reel when it is lowered in a catch basin or the like, the weight of said nozzle head serving to maintain the unreeled portion of said hose taut.

13. In a vehicle, a fluid container, a hose reel, a hose having an end connected to and adapted to be wound on the reel, said end on said reel also being connected to the interior of said container, said hose including a coupling in which a portion of the hose is secured, and a collar clampingly secured on the outside of the hose adjacent said coupling on which pulling strains are imposed to aid in preventing said portion of the hose from being pulled out of said coupling.

14. In a hydraulic apparatus for cleaning catch basins or the like, a settling tank, a hose reel rotatably carried adjacent one end of the tank and having a hollow shaft discharging into the tank, a hose connected to said shaft adapted to be wound on said reel, a hydraulic eductor connected to said hose so as to be suspended from said reel when it is lowered into a catch basin or the like and means for holding said reel against rotation to cause the eductor to be suspended therebelow and at variable distances from the reel depending upon the depth and location of the contents of the basin being cleaned.

15. In a hydraulic apparatus for cleaning catch basins or the like, a tiltable settling tank, a hose reel rotatably carried at an end of the tank which is adapted to be raised during the tilting of the tank, said reel having a hollow shaft discharging into the tank, a hose connected to said shaft adapted to be wound on said reel, a hydraulic eductor connected to said hose so as to be suspended from said reel when it is lowered into a catch basin or the like, pumping means including a flexible pipe line connected to said eductor for forcing fluid therethrough up through said hose and said reel and into said tank and means for tilting the tank to discharge the contents therefrom and to at the same time raise said eductor therewith.

16. In an apparatus for educting material from a receptacle such as a catch basin or the like, means providing a material loading area consisting of a tiltable tank, a reel including a helical conduit leading directly into said loading area to provide for a centrifugal movement of the material delivered to said reel, an eductor nozzle connected to said reel conduit, and means for delivering fluid under pressure to said nozzle to cause material to be impelled from the receptacle through said helical conduit, said tiltable tank being so connected to said reel as to enable tilting of the tank without disconnecting said reel therefrom.

17. In an eduction apparatus for cleaning receptacles such as catch basins or the like, a settling tank, an impeller for circulating fluid under pressure through said tank, an eductor nozzle, a flexible hose connecting said nozzle to said impeller, and means for connecting said nozzle to said tank and for lowering the nozzle into the receptacle comprising a hose connected at its lower end to said nozzle for supporting the nozzle in a substantially vertical position, a hose reel having a curved discharge passage connected at one end axially of the reel to the interior of said tank and at its other end to the upper end of said hose, and mechanism for controlling the rotation of said reel so that said hose may be progressively unreeled to support said nozzle in different vertical positions as the nozzle is lowered.

RONALD CLEMENT EVANS.